United States Patent
Tanaka et al.

(10) Patent No.: US 9,566,974 B2
(45) Date of Patent: Feb. 14, 2017

(54) CONTINUOUSLY VARIABLE TRANSMISSION AND METHOD OF CONTROLLING THE SAME

(71) Applicants: JATCO LTD, Fuji-shi, Shizuoka (JP); NISSAN MOTOR CO., LTD., Yokohama-shi, Kanagawa (JP)

(72) Inventors: Hiroyasu Tanaka, Atsugi (JP); Mamiko Inoue, Ebina (JP); Ryousuke Nonomura, Kawasaki (JP); Takuichiro Inoue, Fujisawa (JP); Norio Asai, Atsugi (JP); Masato Mori, Isehara (JP); Satoru Ishii, Yokohama (JP); Fumito Shinohara, Mishima (JP)

(73) Assignees: JATCO LTD, Fuji-Shi (JP); NISSAN MOTOR CO., LTD., Yokohama-Shi (JP)

( * ) Notice: Subject to any disclaimer, the term of this patent is extended or adjusted under 35 U.S.C. 154(b) by 240 days.

(21) Appl. No.: 14/364,429

(22) PCT Filed: Nov. 9, 2012

(86) PCT No.: PCT/JP2012/079128
§ 371 (c)(1),
(2) Date: Jun. 11, 2014

(87) PCT Pub. No.: WO2013/088875
PCT Pub. Date: Jun. 20, 2013

(65) Prior Publication Data
US 2014/0342876 A1    Nov. 20, 2014

(30) Foreign Application Priority Data

Dec. 12, 2011   (JP) .................................. 2011-271309

(51) Int. Cl.
*B60W 10/10*   (2012.01)
*B60W 10/101*  (2012.01)
(Continued)

(52) U.S. Cl.
CPC ............ *B60W 10/101* (2013.01); *B60W 10/04* (2013.01); *F16H 61/04* (2013.01);
(Continued)

(58) Field of Classification Search
CPC .............................. B60W 10/101; F16H 61/70
See application file for complete search history.

(56) References Cited

U.S. PATENT DOCUMENTS 8,241,178 B2    8/2012  Jozaki et al.
8,277,362 B2   10/2012  Nonomura et al.
(Continued)

FOREIGN PATENT DOCUMENTS

EP    2 275 706 A1    1/2011
JP    61-241561 A    10/1986
(Continued)

*Primary Examiner* — Derek D Knight
(74) *Attorney, Agent, or Firm* — Foley & Lardner LLP

(57) ABSTRACT

A transmission controller executes synchronization shift of shifting a variator in a direction opposite to a speed ratio change direction of a sub transmission mechanism when shifting a sub transmission mechanism. When a gear position of the sub transmission mechanism is at the second gear position and an output increase request of a power source is made, the transmission controller prohibits the synchronization shift and shifts only the sub transmission mechanism from a second gear position to a first gear position.

6 Claims, 6 Drawing Sheets

(51) Int. Cl.
  *F16H 61/04*  (2006.01)
  *F16H 61/662*  (2006.01)
  *F16H 61/70*  (2006.01)
  *B60W 10/04*  (2006.01)
  *F16H 9/18*  (2006.01)
  *F16H 61/08*  (2006.01)
  *F16H 37/02*  (2006.01)

(52) U.S. Cl.
  CPC ....... *F16H 61/66259* (2013.01); *F16H 61/70* (2013.01); *B60Y 2400/72* (2013.01); *F16H 9/18* (2013.01); *F16H 2037/023* (2013.01); *F16H 2061/085* (2013.01); *Y10T 477/688* (2015.01)

(56) References Cited

U.S. PATENT DOCUMENTS

| | | | |
|---|---|---|---|
| 2010/0075799 A1* | 3/2010 | Suzuki | F16H 61/0437 477/44 |
| 2010/0248886 A1 | 9/2010 | Jozaki et al. | |
| 2011/0015033 A1 | 1/2011 | Nonomura et al. | |

FOREIGN PATENT DOCUMENTS

| | | |
|---|---|---|
| JP | 63-266265 A | 11/1988 |
| JP | 63-266266 A | 11/1988 |
| JP | 05-079554 A | 3/1993 |
| JP | 2002-139140 A | 5/2002 |
| JP | 2010-230118 A | 10/2010 |
| JP | 2011-021716 A | 2/2011 |

\* cited by examiner

CONTINUOUSLY VARIABLE TRANSMISSION AND METHOD OF CONTROLLING THE SAME

TECHNICAL FIELD

The present invention relates to a continuously variable transmission and a control method of the continuously variable transmission and, more particularly, relates to a continuously variable transmission comprising a variator (continuously variable transmission mechanism) and a sub transmission mechanism.

BACKGROUND ART

A continuously variable transmission whose available speed ratio range is expanded by employing a configuration of providing a sub transmission in series with respect to a variator (continuously variable transmission mechanism) and changing a gear position of this sub transmission mechanism according to a driving state of a vehicle without increasing a size of the variator is known.

JP5-79554A discloses a shift mode (hereinafter referred to as "synchronization shift") which changes a speed ratio of the variator in a direction opposite to a speed ratio change direction of the sub transmission mechanism when changing a gear position of a sub transmission mechanism in such a continuously variable transmission equipped with the sub transmission mechanism. By performing this synchronization shift, speed changes of an engine and a torque converter decrease when the sub transmission mechanism is shifted, so that it is possible to reduce a shift shock due to these inertia torques.

SUMMARY OF INVENTION

However, the above-mentioned synchronization shift is a shift mode of simultaneously shifting a variator and a sub transmission mechanism, and therefore requires a large amount of oil compared to a case where only one of the variator and the sub transmission mechanism is shifted. Therefore, when the synchronization shift is performed in a region in which the amount of oil supplied from an oil pump becomes small, the amount of oil lacks, and then a time required for synchronization shift becomes long, which leads to give a sense of stagnation to a driver.

Furthermore, even in an engine rotation speed range allowing a sufficient amount of oil to be assured, the above-mentioned synchronization shift delays a shift speed of the sub transmission mechanism in association with the variator and requires a long shift time compared to a case where the sub transmission mechanism is shifted separately, and therefore if the synchronization shift is performed in a situation in which a driver deeply presses an accelerator to accelerate a vehicle, there is a possibility that a driver's acceleration request cannot be satisfied due to shift delay.

The present invention has been made in light of such a technical problem, and an object of the present invention is to overcome shift delay caused by the above synchronization shift, and to enhance driving performance of a vehicle mounted with a continuously variable transmission comprising a sub transmission.

According to one aspect of the present invention, a continuously variable transmission is provided which is characterized by comprising: a variator which can continuously change a speed ratio; a sub transmission mechanism arranged in series with respect to the variator and including a first gear position and a second gear position whose speed ratio is smaller than the first gear position as gear positions; synchronization shift means configured to shift the variator in a direction opposite to a speed ratio change direction of the sub transmission mechanism when shifting the sub transmission mechanism; and non-synchronization shift means configured to prohibit synchronization shift, and shift only the sub transmission mechanism from the second gear position to the first gear position when the gear position of the sub transmission mechanism is at the second gear position and an output increase request of a power source is made.

According to another aspect of the present invention, a control method of a continuously variable transmission is provided, in which the sub transmission mechanism is arranged in series with respect to the variator and including a first gear position and a second gear position whose speed ratio is smaller than the first gear position as gear positions characterized by including: a synchronization shift step of shifting the variator in a direction opposite to a speed ratio change direction of the sub transmission mechanism when shifting the sub transmission mechanism; and a non-synchronization shift step of prohibiting synchronization shift, and shifting only the sub transmission mechanism from the second gear position to the first gear position when the gear position of the sub transmission mechanism is at the second gear position and an acceleration request is made.

According to these aspects, when a gear position of the sub transmission mechanism is at the second gear position and an output increase request of a power source is made, the sub transmission mechanism is immediately shifted and a speed ratio of the transmission is changed to a Low side. There is no shift delay as in the case of performing synchronization shift, and it is possible to enhance driving performance of a vehicle mounted with the continuously variable transmission comprising the sub transmission mechanism.

An embodiment of the present invention and an advantage of the present invention will be described in detail below with reference to the accompanying drawings.

DESCRIPTION OF EMBODIMENTS

A "speed ratio" of a certain transmission mechanism is a value obtained by dividing an input rotation speed of the transmission mechanism by an output rotation speed of the transmission mechanism. Furthermore, a "Lowest speed ratio" means a maximum speed ratio of the transmission mechanism, and a "Highest speed ratio" means a minimum speed ratio of the transmission mechanism.

Figure 1:
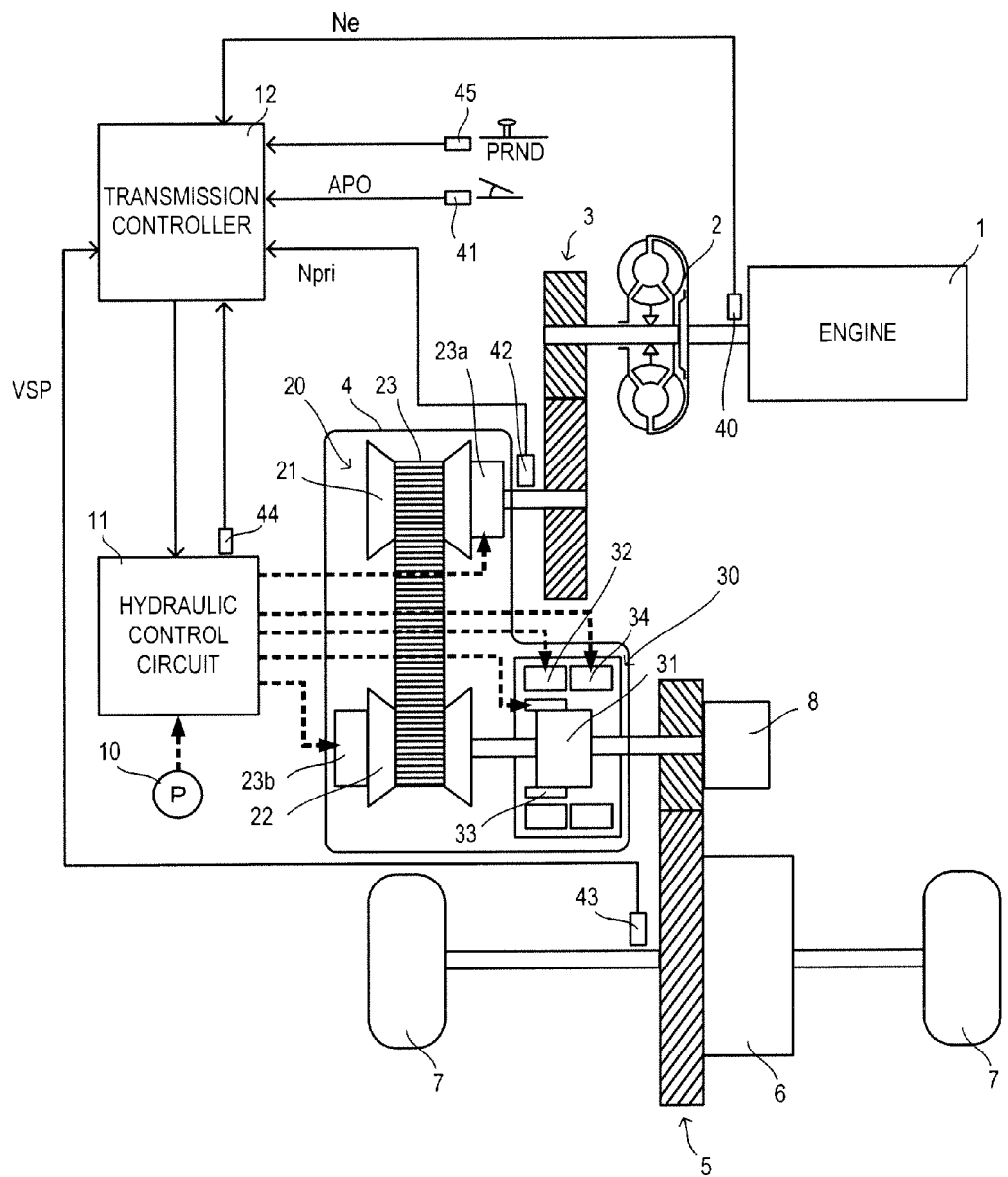
FIG. 1 is a schematic configuration diagram of a vehicle mounted with a continuously variable transmission according to an embodiment of the present invention.

FIG. 1 is a schematic configuration diagram of a vehicle mounted with a continuously variable transmission according to an embodiment of the present invention. This vehicle comprises an engine 1 as a power source. Output rotation of the engine 1 is transmitted to driving wheels 7 via a torque converter 2 with a lock-up clutch, a first gear train 3, a continuously variable transmission (hereinafter referred to simply as a "transmission 4"), a second gear position train 5, and a differential gear unit 6. The second gear position train 5 is provided with a parking mechanism 8 which mechanically locks an output shaft of the transmission 4 in unrotatable manner during parking.

Furthermore, the vehicle is provided with an oil pump 10 which is driven using part of power of the engine 1, a hydraulic control circuit 11 which adjusts an oil pressure from the oil pump 10 and supplies the oil pressure to each part of the transmission 4, and a transmission controller 12 which controls the hydraulic control circuit 11.

Each component will be described. The transmission 4 comprises a variator 20 (continuously variable transmission mechanism) and a sub transmission mechanism 30 provided in series with respect to the variator 20. The phrase "provided in series" means that the variator 20 and the sub transmission mechanism 30 are provided in series in a same power transmission path. The sub transmission mechanism 30 may be directly connected to the output shaft of the variator 20 as in this example, or may be connected via another transmission mechanism or power transmission mechanism (e.g. a gear train).

The variator 20 is a belt-type continuously variable transmission mechanism comprising a primary pulley 21, a secondary pulley 22, and a V belt 23 which is wound between the pulleys 21 and 22. The pulleys 21, 22 respectively have a fixed conical plate, a movable conical plate arranged in a state where a sheave surface is opposed to this fixed conical plate and forming a V groove between the movable conical plate and the fixed conical plate, and a hydraulic cylinder 23a or 23b provided in a back surface of the movable conical plate and displaces the movable conical plate in an axial direction. When an oil pressure which is supplied to the hydraulic cylinder 23a or 23b is adjusted, a width of the V groove changes and a contact radius of each of the pulleys 21, 22 changes, and then a speed ratio vRatio of the variator 20 continuously changes.

The sub transmission mechanism 30 is a transmission mechanism of two forward gear positions and one backward gear position. The sub transmission mechanism 30 comprises a Ravigneaux planetary gear mechanism 31 in which carriers of two planetary gears are coupled and a plurality of frictional engagement elements (a Low brake 32, a High clutch 33 and a Rev brake 34) which are connected to a plurality of rotating elements forming the Ravigneaux planetary gear mechanism 31 and change the coupling state of these elements. Once supply of an oil pressure to each of the frictional engagement elements 32-34 is adjusted and a engaged/released state of each of the frictional engagement elements 32-34 is changed, a gear position of the sub transmission mechanism 30 is changed. For example, when the Low brake 32 is engaged and the High clutch 33 and the Rev brake 34 are released, a gear position of the sub transmission mechanism 30 is shifted to the first gear position. When the High clutch 33 is engaged and the Low brake 32 and the Rev brake 34 are released, the gear position of the sub transmission mechanism 30 is shifted to the second gear position whose speed ratio is smaller than the first gear position. Furthermore, when the Rev brake 34 is engaged and the Low brake 32 and the High clutch 33 are released, the gear position of the sub transmission mechanism 30 is shifted to a backward traveling. It is noted that, in the following description, it will be expressed as that "the transmission 4 is in a low speed mode" when the gear position of the sub transmission mechanism 30 is at the first gear position, and it will be expressed as "the transmission 4 is in a high speed mode" when the gear position is at the second gear position.

Figure 2:
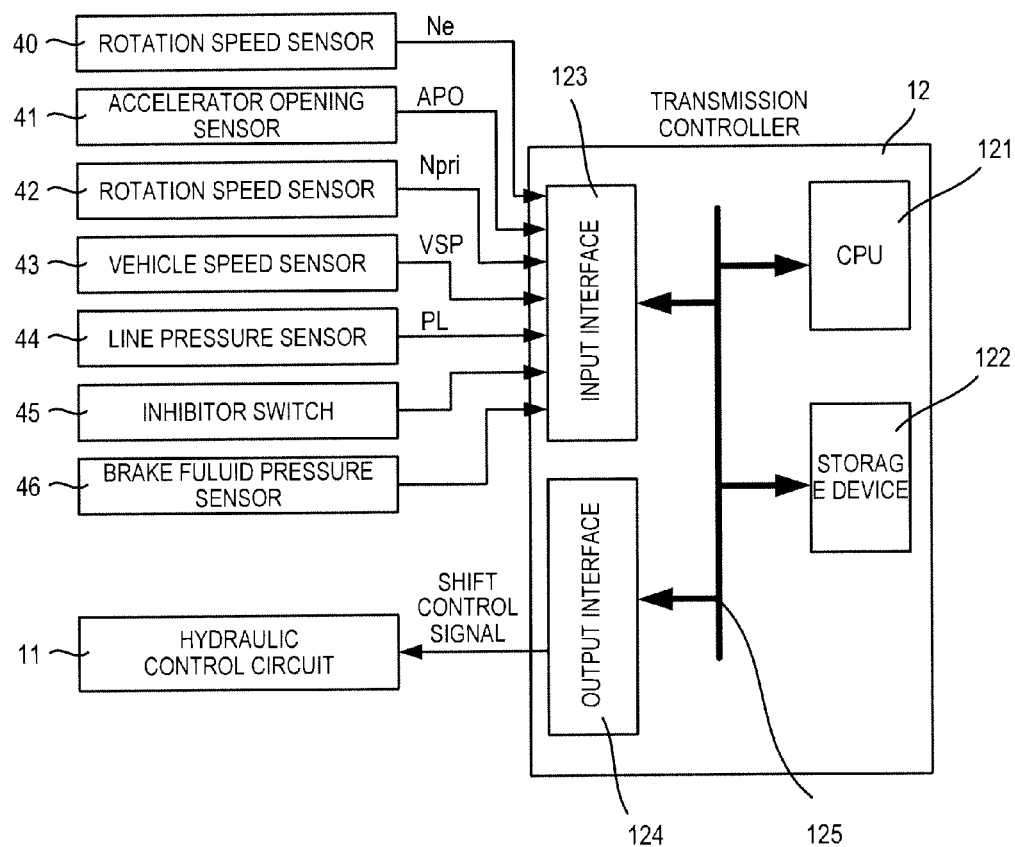
FIG. 2 is a view illustrating an internal configuration of a transmission controller.

As illustrated in FIG. 2, the transmission controller 12 is configured from a CPU 121, a storage device 122 composed of a RAM and a ROM, an input interface 123, an output interface 124 and a bus 125 which mutually connects these components.

The input interface 123 receives: an input of an output signal of a rotation speed sensor 40 which detects a rotation speed of the engine 1 (hereinafter referred to as an "engine rotation speed Ne"); an output signal of an accelerator opening sensor 41 which detects an opening of an accelerator pedal (hereinafter referred to as an "accelerator opening APO"); an output signal of a rotation speed sensor 42 which detects an input rotation speed of the transmission 4 (=a rotation speed of the primary pulley 21, hereinafter referred to as a "primary rotation speed Npri"); an output signal of a vehicle speed sensor 43 which detects a traveling speed of a vehicle (hereinafter referred to as a "vehicle speed VSP"); an output signal of an oil temperature sensor 44 which detects an oil temperature of the transmission 4; an output signal of an inhibitor switch 45 which detects a position of a select lever; and the like.

The storage device 122 stores a shift control program of the transmission 4 (FIG. 4) and a shift map (FIG. 3) used in this shift control program. The CPU 121 reads and executes the shift control program stored in the storage device 122, generates a shift control signal by applying various types of arithmetic processing to various signals inputted via the input interface 123, and outputs the generated shift control signal to the hydraulic control circuit 11 via the output interface 124. Various values used by the arithmetic processing by the CPU 121 and arithmetic results are adequately stored in the storage device 122.

The hydraulic control circuit 11 includes a plurality of flow paths and a plurality of hydraulic control valves. The hydraulic control circuit 11 switches a supply path of an oil pressure by controlling a plurality of hydraulic control valves based on a shift control signal from the transmission controller 12, adjusts the oil pressure generated by the oil pump 10 to a necessary oil pressure and supplies this oil pressure to each part of the transmission 4. Consequently, the speed ratio vRatio of the variator 20 and the gear position of the sub transmission mechanism 30 are changed to shift the transmission 4.

Figure 3:
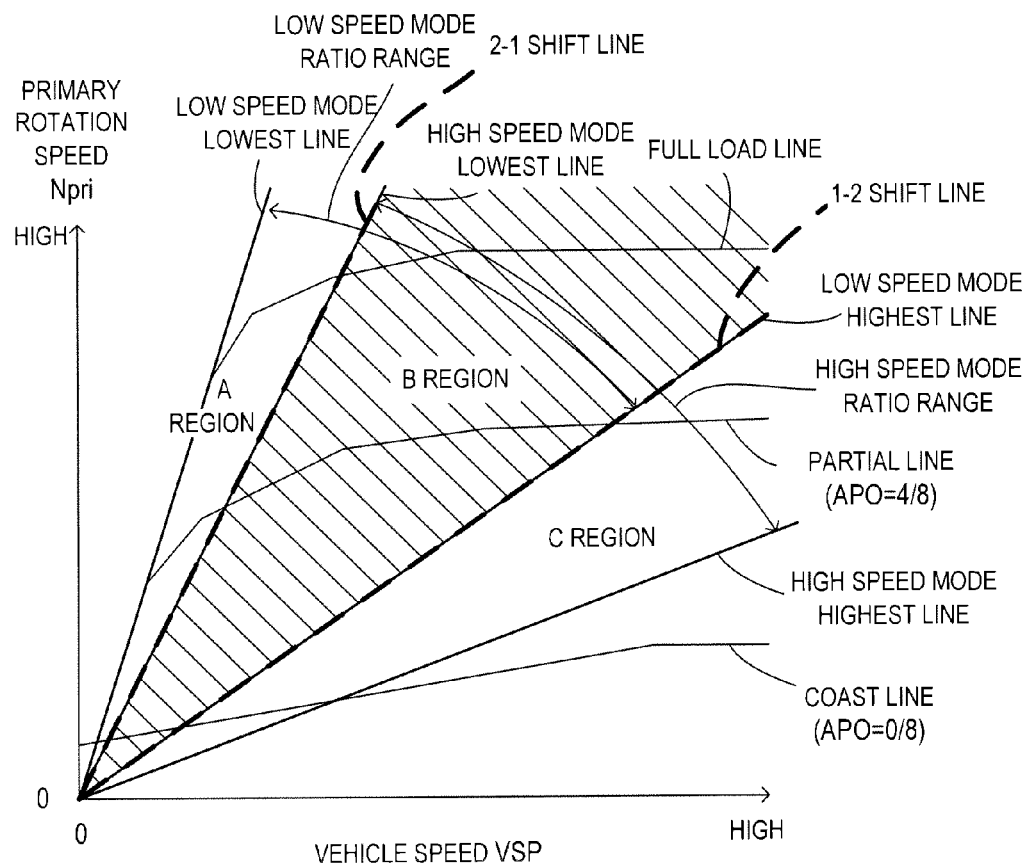
FIG. 3 is a view illustrating an example of a shift map.

FIG. 3 illustrates an example of a shift map stored in the storage device 122.

In this shift map, an operating point of the transmission 4 is defined by the vehicle speed VSP and a primary rotation speed Npri. An inclination of a line connecting the operating point of the transmission 4 and a zero point at a lower left corner of the shift map corresponds to a speed ratio of the transmission 4 (an entire speed ratio obtained by multiplying the speed ratio of the variator 20 with a speed ratio of the sub transmission mechanism 30 and hereinafter referred to as a "through ratio"). It is noted that, when a counter gear is provided between the torque converter 2 and the primary pulley 21, a shift map is used in which a turbine rotation speed Ntbn which takes into account a counter gear ratio is set as a longitudinal axis instead of the primary rotation speed Npri.

The transmission controller 12 sets a target operating point of the transmission 4 (a target through ratio) according to a driving state of a vehicle (the vehicle speed VSP and the accelerator opening APO) based on this shift map, and controls the variator 20 and the sub transmission mechanism 30 to achieve the target operating point of the transmission 4.

Content of the shift map will be described. A shift line is set to this shift map per accelerator opening APO similar to the shift map of a conventional belt continuously variable transmission, and the transmission 4 is shifted according to a shift line selected according to the accelerator opening APO. It is noted that, FIG. 3 illustrates only a full load line (a shift line in case of accelerator opening APO=8/8), a partial line (a shift line in case of accelerator opening APO=4/8) and a coast line (a shift line in case of accelerator opening APO=0/8) for simplicity.

When the transmission 4 is in the low speed mode, the transmission 4 can be shifted between a low speed mode Lowest line obtained by setting the speed ratio of the variator 20 to the Lowest speed ratio and a low speed mode Highest line obtained by setting the speed ratio of the variator 20 to the Highest speed ratio. In this case, the operating point of the transmission 4 moves in an A region and a B region. Meanwhile, when the transmission 4 is in the high speed mode, the transmission 4 can be shifted between the high speed mode Lowest line obtained by setting the speed ratio of the variator 20 to the Lowest speed ratio and the high speed mode Highest line obtained by setting the speed ratio of the variator 20 to the Highest speed ratio. In this case, the operating point of the transmission 4 moves in the B region and a C region.

The speed ratio of each gear position of the sub transmission mechanism 30 is set such that a speed ratio (low speed mode Highest speed ratio) corresponding to the low speed mode Highest line is smaller than the speed ratio (high speed mode Lowest speed ratio) corresponding to the high speed mode Lowest line. Consequently, a range of a through ratio of the transmission 4 which can be adopted in the low speed mode ("low speed mode ratio range" in the figure) and a range of a through ratio of the transmission 4 which can be adopted in the high speed mode ("high speed mode ratio range" in the figure) partially overlap. And when the operating point of the transmission 4 is in the B region sandwiched between the high speed mode Lowest line and the low speed mode Highest line, the transmission 4 can select both modes of the low speed mode and the high speed mode.

Furthermore, a 1-2 shift line and a 2-1 shift line for shifting the sub transmission mechanism 30 are respectively set on this shift map to overlap the low speed mode Highest line and the high speed mode Lowest line.

Still further, when the target operating point of the transmission 4 crosses the 1-2 shift line from the Low side to the High side and crosses the 2-1 shift line from the High side to the Low side (except when an accelerator pedal is pressed in an engine low rotation speed range and when the accelerator pedal is deeply pressed as described below), the transmission controller 12 performs synchronization shift described below and switches between the high speed mode and the low speed mode.

In synchronization shift, the transmission controller 12 shifts the sub transmission mechanism 30, and shifts the variator 20 in a direction opposite to the speed ratio change direction of the sub transmission mechanism 30. In this regard, an inertia phase in which the speed ratio of the sub transmission mechanism 30 actually changes and a period in which the speed ratio of the variator 20 changes are synchronized to keep a through ratio constant before and after the shift.

More specifically, when the target operating point of the transmission 4 crosses the 1-2 shift line from the Low side to the High side, the transmission controller 12 changes the gear position of the sub transmission mechanism 30 from the first gear position to the second gear position (1-2 shift and upshift), and changes the speed ratio of the variator 20 to the Low side.

Conversely, when the target operating point of the transmission 4 crosses the 2-1 shift line from the High side to the Low side (except when an accelerator pedal is pressed in the engine low rotation speed range and when the accelerator pedal is deeply pressed as described below), the transmission controller 12 changes the gear position of the sub transmission mechanism 30 from the second gear position to the first gear position (2-1 shift, downshift), and changes the speed ratio of the variator 20 to the High side.

Figure 4:
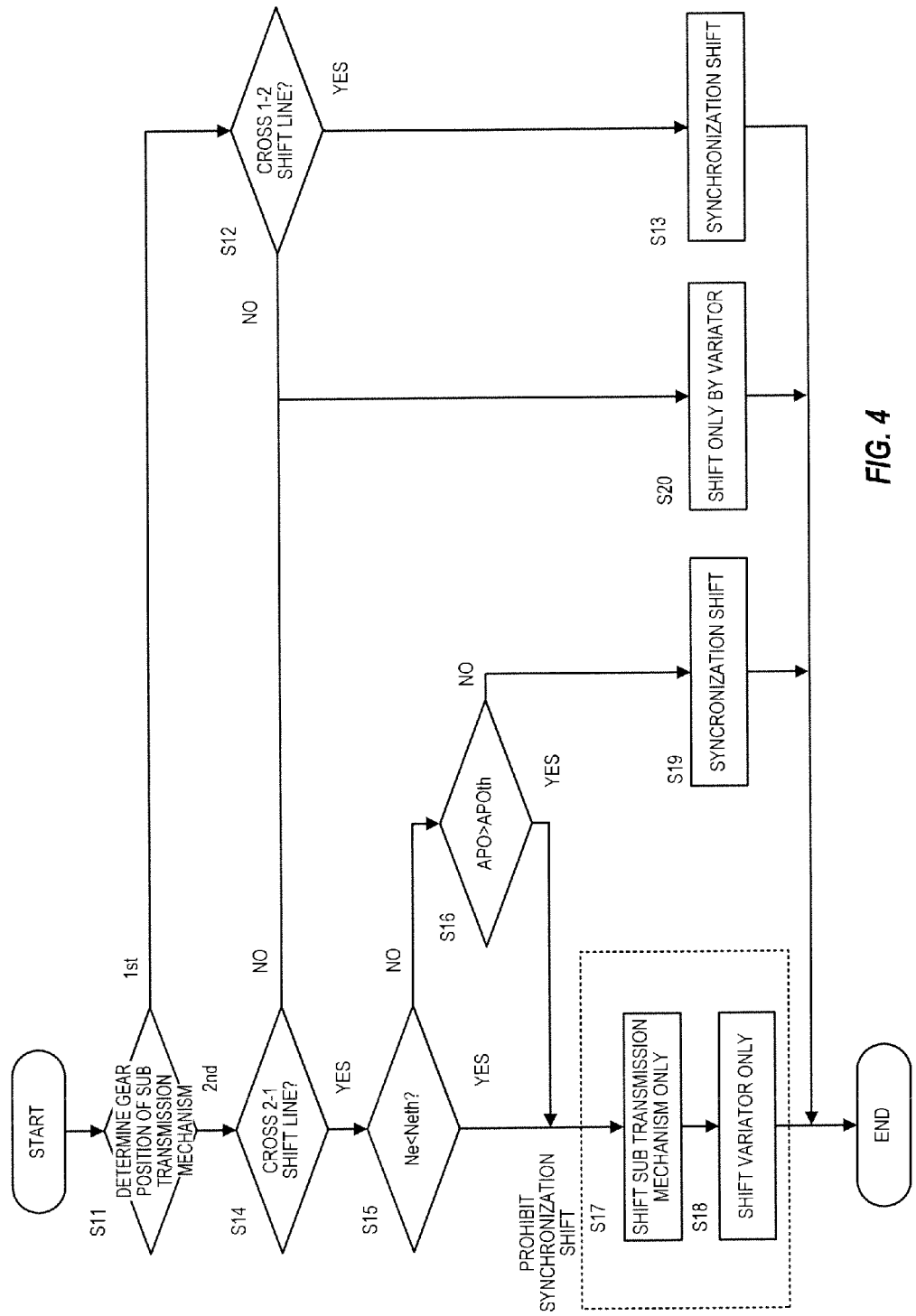
FIG. 4 is a flowchart illustrating content of a shift control program.

FIG. 4 is a flowchart illustrating content of the shift control program of the transmission 4. With reference to this, the content of shift control of the transmission 4 executed by the transmission controller 12 will be described.

According to this flowchart, in S11, the transmission controller 12 first determines a gear position of the sub transmission mechanism 30. When the gear position of the sub transmission mechanism 30 is at the first gear position, processing moves to S12 and, when the gear position is at the second gear position, processing moves to S14.

S12, S13 are processing when the gear position of the sub transmission mechanism is at the first gear position.

In S12, the transmission controller 12 determines whether or not the target operating point of the transmission 4 crosses the 1-2 shift line from the Low side to the High side by the vehicle speed VSP increasing or an accelerator pedal being returned. When the target operating point of the transmission 4 crosses the 1-2 shift line from the Low side to the High side, processing moves to S13 and, when this is not this case, processing moves to S20.

In S13, the transmission controller 12 executes synchronization shift of changing the gear position of the sub transmission mechanism 30 from the first gear position to the second gear position, and changing the speed ratio of the variator 20 from the High side to the Low side.

S14-S19 are processing when the gear position of the sub transmission mechanism is at the second gear position.

In S14, the transmission controller 12 determines whether or not the target operating point of the transmission 4 crosses the 2-1 shift line from the High side to the Low side by the accelerator pedal being depressed, i.e. by an output increase request of the power source or the engine 1 being made. When the target operating point of the transmission 4 crosses the 2-1 shift line from the High side to the Low side, processing moves to S15 and, when this is not the case, processing moves to S20.

In S15, the transmission controller 12 determines whether or not the engine rotation speed Ne is lower than a predetermined low rotation speed Neth. The predetermined low rotation speed Neth is set to a rotation speed at which, when synchronization shift is executed at the predetermined low rotation speed Neth or less, the amount of oil from the oil pump 10 lacks, the balance of the oil pressure deteriorates and the time required for synchronization shift becomes longer than an allowable time (a rotation speed at which the driver starts feeling a sense of stagnation when synchronization shift is executed). When the engine rotation speed Ne is lower than the predetermined low rotation speed Neth, processing moves to S17 and, when this is not the case, processing moves to S16.

In S16, the transmission controller 12 determines whether or not the accelerator opening APO is larger than a predetermined large position APOth. A lower limit value (e.g. APOth=5/8) for determining that the acceleration request by a driver is significant is set to the predetermined large opening APOth. When the accelerator opening APO is larger than the predetermined large position APOth, processing moves to S17 and, when this is not the case, processing moves to S19.

When the engine rotation speed Ne is lower than the predetermined low rotation speed Neth and the accelerator opening APO is larger than the predetermined large position APOth, processing moves to S17 and S18 to prohibit synchronization shift and shift the sub transmission mechanism 30 and the variator 20 in this order to prevent shift delay caused by executing synchronization shift.

That is, the transmission controller 12 first shifts the sub transmission mechanism 30 from the second gear position to the first gear position (S17). This shift is finished only by replacing the Low brake and the High clutch 33, and is finished in a short time. Even in a situation where the engine rotation speed Ne is low and the amount of oil from the oil pump 10 is a little, the amount of oil does not lack and shift delay does not occur. By antecedently shifting the sub transmission mechanism 30 only, the through ratio of the transmission 4 changes to the Low side in a short time, so that it is possible to avoid shift delay.

Subsequently, the transmission controller 12 shifts the variator 20 only (S18), and thereby moves the operating point of the transmission 4 to the target operating point.

In addition, when only the sub transmission mechanism 30 is shifted, the operating point of the transmission 4 is likely to move toward the Low side beyond the target operating point. However, by shifting the variator 20, the operating point of the transmission 4 is returned to the target operating point, and the through ratio is made closer to the target through ratio.

By contrast with this, when the engine rotation speed Ne is higher than the predetermined low rotation speed Neth, and the accelerator opening APO is smaller than the predetermined large position APOth, shift delay does not cause a problem, and then processing moves to S19 and the transmission controller 12 executes synchronization shift.

S20 is common processing when the gear position of the sub transmission mechanism is at the first gear position and at the second gear position, and is executed when the target operating point of the transmission 4 crosses neither the 1-2 shift line nor the 2-1 shift line. In S20, the transmission controller 12 shifts the variator 20 only, and moves the operating point of the transmission 4 to the target operating point.

Figure 5:
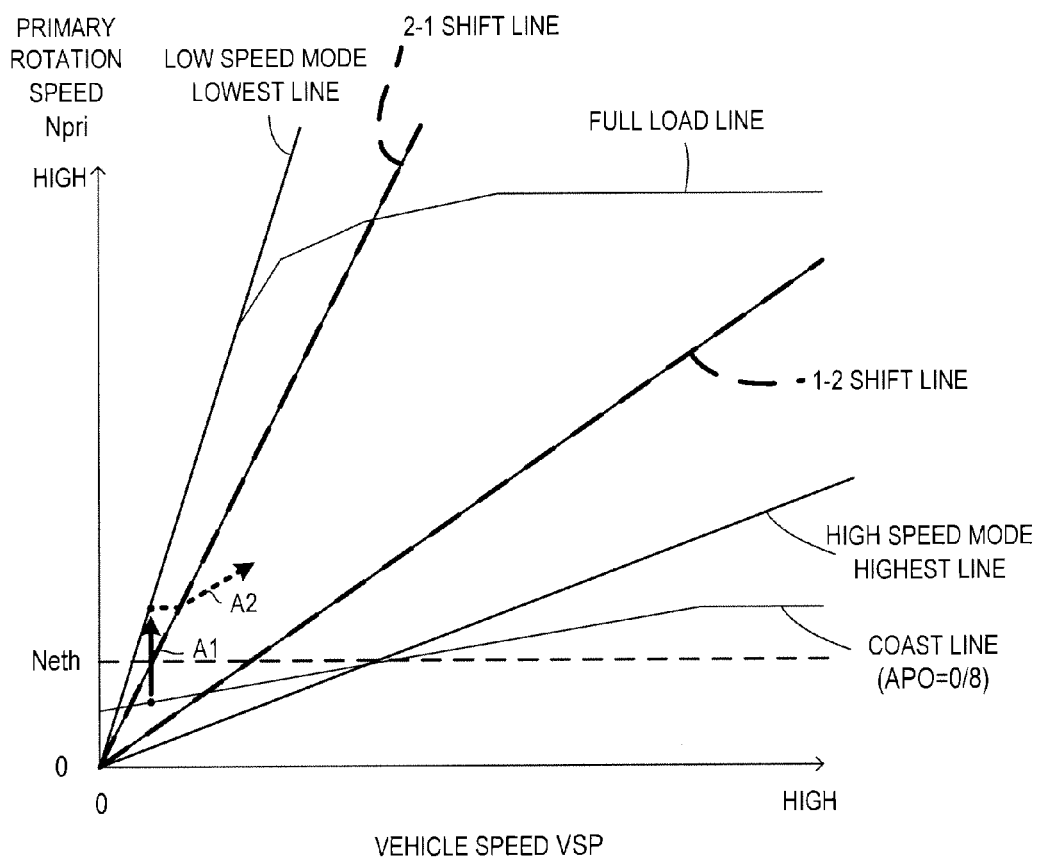
FIG. 5 is a view illustrating a situation where non-synchronization shift is executed.
Figure 6:
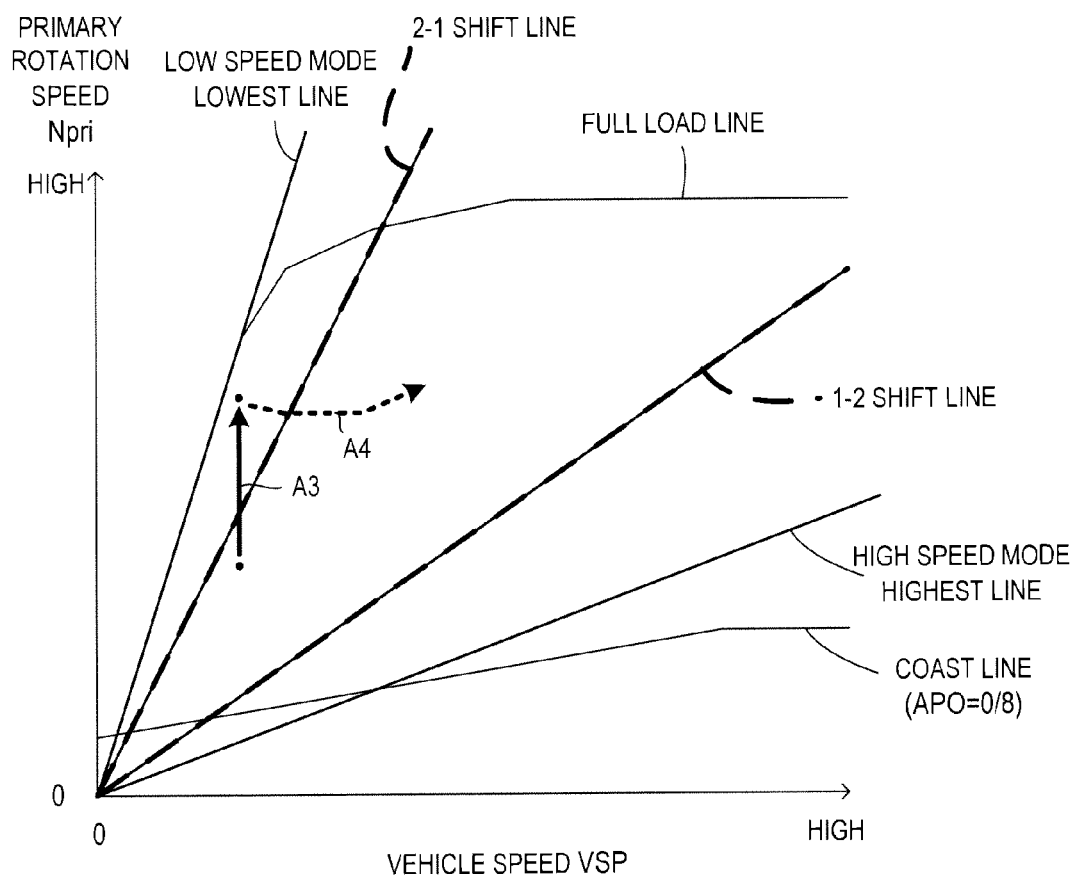
FIG. 6 is a view illustrating the situation where non-synchronization shift is executed.

FIGS. 5, 6 are views illustrating that non-synchronization shift is executed by the above-mentioned shift control.

An example in FIG. 5 illustrates a shift when the accelerator pedal is pressed in the engine low rotation speed range and the target operating point of the transmission 4 crosses the 2-1 shift line.

When the engine rotation speed Ne is lower than the predetermined low rotation speed Neth, if synchronization shift is executed, the amount of oil from the oil pump 10 lacks, the balance of oil deteriorates and a time required for shift becomes long, which is likely to give a sense of stagnation to a driver.

Hence, in such a situation, only the sub transmission mechanism 30 is first shifted from the second gear position to the first gear position, so that the through ratio is changed to the Low side (an arrow A1 in the figure). Only the sub transmission mechanism 30 is shifted, so that, even when the engine rotation speed Ne is low, the amount of oil from the oil pump 10 does not lack and shift of the sub transmission mechanism 30 is finished in a short time.

Subsequently, the variator 20 is shifted, and the target operating point of the transmission 4, i.e., the target through ratio is achieved (an arrow A2 in the figure).

An example in FIG. 6 illustrates that an accelerator pedal is deeply pressed and the target operating point of the transmission 4 crosses the 2-1 shift line.

When the accelerator opening APO is larger than the predetermined large position APOth, if synchronization shift is executed, it is likely that a driver's acceleration request cannot be satisfied.

Hence, in such a situation, only the sub transmission mechanism 30 is first shifted from the second gear position to the first gear position, so that the through ratio is changed to the Low side (an arrow A3 in the figure). The speed of the sub transmission mechanism 30 does not need to be adjusted to a shift speed of the variator 20 as in synchronization shift, so that shifting the sub transmission mechanism 30 is finished in a short time.

Subsequently, the variator 20 is shifted and the target operating point of the transmission 4, i.e., the target through shift ratio is achieved (an arrow A4 in the figure).

In both of FIGS. 5, 6, change delay of the through ratio caused by synchronization shift does not occur, so that it is possible to achieve acceleration intended by the driver and enhance driving performance of the vehicle on which the transmission 4 is mounted.

Although an embodiment of the present invention has been described, the embodiment is merely one of application examples of the present invention and by no means limits the technical scope of the present invention to a specific configuration of the above-mentioned embodiment.

Although, for example, whether or not the balance of an oil pressure deteriorates is determined based on the engine rotation speed Ne in the above-mentioned embodiment (S15), the amount of oil of the oil pump 10 may be directly measured and whether or not the balance of an oil pressure deteriorates may be determined based on the measured amount of oil.

Furthermore, although whether or not an acceleration request from a driver is significant is determined based on the accelerator opening APO (S16), it may be determined based on an operation of a select lever. It is noted that, although synchronization shift is prohibited when an acceleration request from a driver is significant in the above-mentioned embodiment, synchronization shift may be prohibited when an acceleration request is made irrespectively of whether or not the acceleration request is significant.

Furthermore, the output increase request of the engine 1 which is the power source includes that an accelerator pedal is pressed and, in addition, a vehicle speed adjusting level of a cruise control device is operated in a vehicle speed increase direction.

This application claims priority to Japanese Patent Application No. 2011-271309 filed in the Japanese Patent Office on Dec. 12, 2011, the entire contents of which are incorporated by reference herein.

The invention claimed is:

1. A continuously variable transmission comprising:
a variator which can continuously change a speed ratio;
a sub transmission mechanism arranged in series with respect to the variator and including a first gear position and a second gear position whose speed ratio is smaller than the first gear position as gear positions; and a transmission controller configured to
shift the variator in a direction opposite to a speed ratio change direction of the sub transmission mechanism when shifting the sub transmission mechanism; and
prohibit synchronization shift, and shift only the sub transmission mechanism from the second gear position to the first gear position when the gear position of the sub transmission mechanism is at the second gear position and an output increase request of a power source is made.

2. The continuously variable transmission according to claim 1, wherein the transmission controller is configured to shift only the sub transmission mechanism from the second gear position to the first gear position, and then make the speed ratio of the continuously variable transmission close to a target speed ratio by shifting the variator.

3. The continuously variable transmission according to claim 1, wherein the transmission controller is configured to prohibit the synchronization shift when the gear position of the sub transmission mechanism is at the second gear position, a rotation speed of an engine is in a predetermined low rotation speed range and the output increase request of the power source is made.

4. The continuously variable transmission according to claim 1, wherein the transmission controller is configured to prohibit the synchronization shift when the gear position of the sub transmission mechanism is at the second gear position and a driver makes an acceleration request.

5. A control method of a continuously variable transmission, wherein the continuously variable transmission comprises:
a variator which can continuously change a speed ratio; and
a sub transmission mechanism which is arranged in series with respect to the variator and which includes a first gear position and a second gear position whose speed ratio is smaller than the first gear position as gear positions, and wherein the control method comprises:
a synchronization shift step of shifting the variator in a direction opposite to a speed ratio change direction of the sub transmission mechanism when shifting the sub transmission mechanism; and
a non-synchronization shift step of, when the gear position of the sub transmission mechanism is at the second gear position and a driver makes an acceleration request, prohibiting synchronization shift, and shifting only the sub transmission mechanism from the second gear position to the first gear position.

6. A continuously variable transmission comprising:
a variator which can continuously change a speed ratio;
a sub transmission mechanism arranged in series with respect to the variator and including a first gear position and a second gear position whose speed ratio is smaller than the first gear position as gear positions;
synchronization shift means for shifting the variator in a direction opposite to a speed ratio change direction of the sub transmission mechanism when shifting the sub transmission mechanism; and
non-synchronization shift means for prohibiting synchronization shift, and shifting only the sub transmission mechanism from the second gear position to the first gear position when the gear position of the sub transmission mechanism is at the second gear position and an output increase request of a power source is made.

* * * * *